July 25, 1933.  W. T. HAINES  1,919,366
RUBBER LINING FOR ACID CONTAINERS
Filed Feb. 20, 1931
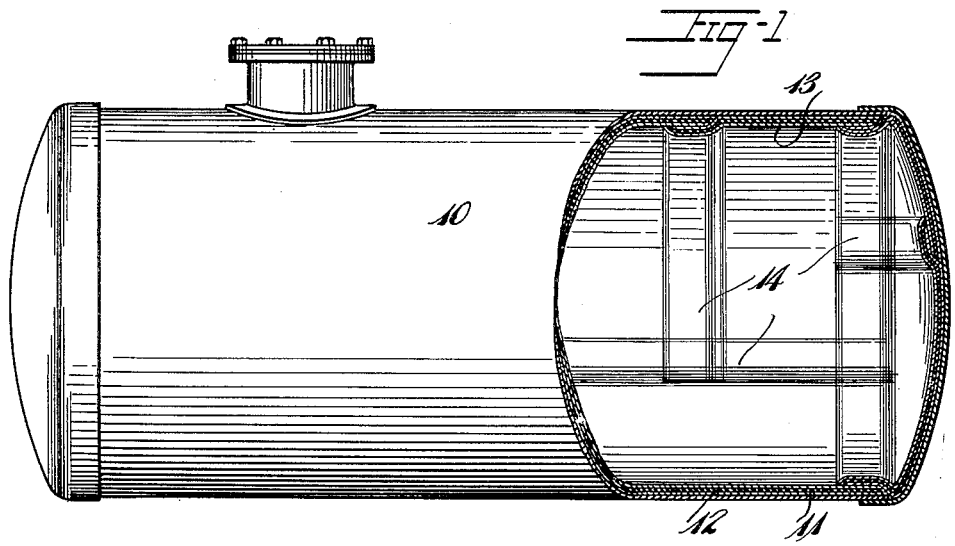
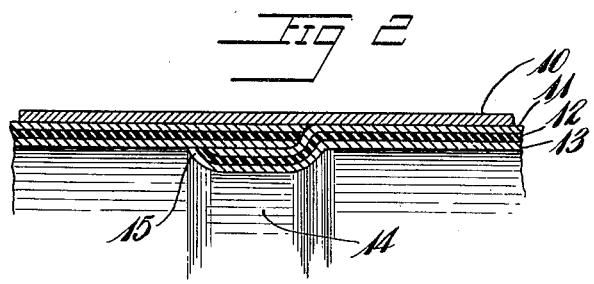
Inventor
Walter T. Haines
By Eakin & Avery
Attys Patented July 25, 1933

1,919,366

UNITED STATES PATENT OFFICE

WALTER T. HAINES, OF STOW, OHIO, ASSIGNOR TO THE B. F. GOODRICH COMPANY, OF NEW YORK, N. Y., A CORPORATION OF NEW YORK

RUBBER LINING FOR ACID CONTAINERS

Application filed February 20, 1931. Serial No. 517,146.

My invention relate to rubber linings for fluid containers and particularly to linings for containers used for storing or conveying corrosive fluids.

Heretofore it has been proposed to line such containers with hard rubber and while many successful installations of that type of lining have been made it has been found that due to the difference in thermal expansion of the walls of the metal container and the hard rubber lining, such a lining frequently becomes cracked by sudden changes in temperature. Such hard rubber linings are difficult to repair when once damaged and are easily damaged by heavy objects falling into the container, and, before they can be repaired, the corrosive fluid may greatly damage the adjacent metal.

It has also been proposed to line containers with soft rubber vulcanized in place. Soft rubber linings have been found to be pervious to certain fluids, especially to the organic acids and other organic compounds and are therefore unsatisfactory for use where such fluids are to be stored or conveyed.

The objects of my invention are to provide a more satisfactory lining construction which will afford superior protection to the container and to the fluid contained therein, which may be easily constructed, and which may be readily repaired when desired.

Other objects will be apparent from the following description and the accompanying drawing, in which Fig. 1 is an elevation, partly in section, showing a container provided with the lining construction of my invention, and Fig. 2 is a longitudinal section on a larger scale of a portion of the structure.

Referring to the drawing, I accomplish the aforementioned objects of my invention by providing a lining composed of three layers and built up in sections having lap seams. The middle layer of the lining is formed of hard rubber composition and is confined between layers of soft rubber. In the drawing the numeral 10 designates the wall of the container, which ordinarily is formed of metal although other materials may be used. The lining material consists of an outer layer of soft rubber 11, a middle layer of hard rubber 12, and an inner layer of soft rubber 13. The three layers of rubber are assembled in the order named in the unvulcanized state and are applied to the wall of the container as a unitary sheet by means of cement.

In applying the sheet material to the walls of the container I cut the material to form pieces of less extent than the side of the container to which they are to be applied and assemble them on the container wall with their edges overlapping so as to form seams 14, which in the finished lining provide expansion joints, as the respective adjoining hard rubber layers are separated at all ponts by a substantial layer of soft rubber. In cutting and applying the sheets of material I find that by skiving the edges thereof the presence of abrupt bends in the hard rubber layers at the seams is avoided and the overlapping edge of the hard rubber layer may be completely covered by the extending margin of the soft rubber inner layer, as indicated at 15.

The use of both longitudinal and circumferential expansion joints provides for differences of thermal expansion in both directions. By the provision of a plurality of expansion joints in a certain length of wall, coupled with the provision of the soft rubber cushion layer between the hard rubber and the wall of the container, I secure a construction in which the difference in expansion between the container wall and the hard rubber supported thereby is distributed over a number of sections of hard rubber in such a manner that the expansive or contractive differences over the area of one section will not be greater than can be compensated for by the extensibility of the soft rubber therebetween and the total difference in the entire extent of the container will be distributed among the expansion joints provided between sections throughout the extent of the container.

The presence of the hard rubber layer in the sections of lining material prevents permeation of liquid therethrough in a direction normal thereto and the length of cushion rubber between lapping sections of hard rubber lengthens the path which a liquid would have to travel from the inside of the container to the metallic wall, so that permeation at these points is prevented without adding an extreme thickness of soft rubber.

The inner layer of soft rubber acts in conjunction with the outer layer in cushioning the hard rubber layer against vibration and localized strains. It also prevents damage to the hard rubber layer from dropping of sounding rods or other heavy articles into the container and makes possible the repair of the lining in case of damage thereto, as it provides a layer of soft rubber to which a patch may be vulcanized.

What I claim is:

1. A chemically-resistant structure comprising a rigid wall structure and, adhered thereto, a cushion layer of soft rubber, a non-permeable layer of hard rubber, and a protective layer of soft rubber, in the order named.

2. A chemically-resistant structure comprising a rigid wall structure and a lining therefor formed of a plurality of adjoining laminated sheets of rubber material, each sheet comprising a layer of hard rubber between sheets of soft rubber, said laminated sheets being joined by a lap seam to provide a continuous lining having an expansion joint.

3. A chemically-resistant structure comprising rigid wall structure and a lining therefor formed of a plurality of separate sheets of hard rubber overlapping each other at their margins, a cushion layer of soft rubber between the rigid wall and the hard rubber sheets adapted to support said sheets from said wall and to yield when subjected to differences in thermal expansion of the hard rubber sheets and the wall, and resilient means for sealing the overlapped seams.

4. A chemically-resistant structure comprising a rigid wall structure and a lining therefor formed of a plurality of separate sheets of hard rubber overlapping each other at their margins, a cushion layer of soft rubber between said wall and said sheets adapted to support said sheets from said wall and to yield when subjected to differences in thermal expansion of said sheets and said wall, and a continuous protective layer of soft rubber covering said hard rubber sheets.

5. A chemically-resistant structure comprising a rigid wall structure, a plurality of disconnected hard rubber plates, resilient means supported by the wall structure and securing said plates thereto and permitting expansion and contraction thereof relative to said wall structure, and a plurality of expansion joints between said plates.

WALTER T. HAINES.